(12) United States Patent
Edelstein

(10) Patent No.: US 7,185,541 B1
(45) Date of Patent: Mar. 6, 2007

(54) MEMS MAGNETIC DEVICE AND METHOD

(75) Inventor: Alan S. Edelstein, Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/345,541

(22) Filed: Feb. 2, 2006

Related U.S. Application Data (60) Provisional application No. 60/650,000, filed on Feb. 3, 2005.

(51) Int. Cl.
*G01P 15/08* (2006.01)
(52) U.S. Cl. .................. 73/514.16; 73/514.31
(58) Field of Classification Search .......... 73/514.16, 73/514.29, 514.36, 514.38, 514.12, 514.31; 324/207.2, 207.21, 207.22, 244–260, 225
See application file for complete search history.

(56) References Cited

U.S. PATENT DOCUMENTS

| | | | | |
|---|---|---|---|---|
| 4,810,965 A | * | 3/1989 | Fujiwara et al. | 324/207.22 |
| 4,967,598 A | * | 11/1990 | Wakatsuki et al. | 73/514.12 |
| 5,747,692 A | * | 5/1998 | Jacobsen et al. | 73/514.25 |
| 5,983,724 A | * | 11/1999 | Yoshida | 73/652 |
| 6,072,174 A | * | 6/2000 | Togawa et al. | 250/225 |
| 6,079,267 A | * | 6/2000 | Hull | 73/382 R |
| 6,501,268 B1 | * | 12/2002 | Edelstein et al. | 324/244 |

FOREIGN PATENT DOCUMENTS

JP 2002-357665 * 12/2002

OTHER PUBLICATIONS

Hanse, J., "Honeywell MEMS Inertial Technology & Product Status," in PLANS 2004, Position Location and Navigation Symposium (IEEE Cat. No. 04CH37556), 2004, pp. 43-48.
Otake, Y., "Development of a Horizontal Component Seismometer Using a Magnetic Spring," Review of Scientific Instruments, vol. 71, No. 12, Dec. 2000, pp. 4576-4581.
Meydan, T., "Recent Trends in Linear and Angular Accelerometers," Sensors and Actuators A, 59, 1997, pp. 43-50.

(Continued)

*Primary Examiner*—Helen Kwok
(74) *Attorney, Agent, or Firm*—Edward L. Stolarun (57) ABSTRACT

A MEMS device and method of manufacturing comprises a magnetic sensor attached to a frame; at least one magnet adjacent to the magnetic sensor; a proof mass attached to the magnet; a cantilever beam attached to the proof mass; and a rod attached to the cantilever beam and the frame, wherein the magnet is adapted to rotate about a longitudinal axis of the rod. The proof mass comprises a portion of a SOI wafer. An acceleration of the frame causes the magnet to move relative to the frame and the magnetic sensor. An acceleration of the frame causes the connecting member to bend. The motion of the magnet causes a change in a magnetic field at a position of the magnetic sensor, wherein the change in the magnetic field is detected by the magnetic sensor, and wherein a sensitivity of detection of the acceleration of the device is approximately 0.0001 g.

21 Claims, 5 Drawing Sheets

OTHER PUBLICATIONS

Kryuchkov, Y., "Possible Application of MPW Effect for Sensitive Acceleration Measurements," IEEE Transactions on Applied Superconductivity, vol. 14, No. 3, Sep. 2004, pp. 2001-2007.

Jean-Michel, S., "Market Opportunities for Advanced MEMS Accelerometers and Overview of Actual Capabilities vs. Required Specifications," in PLANS 2004, Position Location and Navigation Symposium (IEEE Cat. No. 04CH37556), 2004, pp. 78-82.

Amini, B. et al., "A 2.5V 14-BIT $\Sigma\Delta$ CMOS-SOI Capacitive Accelerometer," in 2004 IEEE International Solid-State Circuits Conference (IEEE Cat. No. 04CH37519), 2004, Session 17, MEMS and Sensors, 17.3, 10 pages.

* cited by examiner

MEMS MAGNETIC DEVICE AND METHOD

CROSS-REFERENCE TO RELATED APPLICATIONS

This application claims the benefit of U.S. Provisional Patent Application No. 60/650,000 filed on Feb. 3, 2005, the complete disclosure of which, in its entirety, is herein incorporated by reference.

GOVERNMENT INTEREST

The embodiments described herein may be manufactured, used, and/or licensed by or for the United States Government without the payment of royalties thereon.

BACKGROUND

1. Field of the Invention

The embodiments herein generally relate to microelectromechanical systems (MEMS) technology and, more particularly, to electromagnetic MEMS devices.

2. Description of the Related Art

There are many military uses for seismometers and accelerometers. For example, accelerometers have been used for years for safe and arming (S&A) in the area of fuzing. Tests show that seismometers are one of the best sensors for detecting personnel. Accelerometers can be used for pyroshock, that is the transient response of a structure to loading induced by the ignition of pyrotechnic (explosive or propellant activated) devices. Generally, MEMS accelerometers are sensors that use a variety of approaches that include measuring capacitance changes, tunneling, and using piezoelectric, ferroelectric and optical materials. Accelerometers have also been used in controlling and monitoring military and aerospace systems. This last application includes smart weapon systems (e.g., direct and indirect fire; and aviation-launched and ship-launched missiles, rockets, projectiles, and submunitions). However, there is a need for low cost, small, sensitive accelerometers.

There are accelerometers and seismometers that make use of magnetic components. One of the most standard seismometers measures the voltage induced when a permanent magnetic moves inside a coil. The magnetostriction of amorphous materials bonded onto cantilevers has been used to make accelerometers. These solutions utilize $Fe_{67}Co_{18}B_{14}Si$, which is a material with a saturation magnetostriction of 35 ppm. Other solutions use a magnetic spring interacting with a permanent magnet to make a horizontal component seismometer. Moreover, high sensitivity accelerometers can be fabricated using superconductivity. Unfortunately, these devices tend to be rather expensive to fabricate.

Some seismometers can detect $10^{-5}$ G's of force. Furthermore, some seismometers have an operating range of DC to 100 Hz. Generally, one problem with these conventional seismometers is that they are rather large in size. Moreover, it is generally difficult to couple them to the ground or other surfaces. For example, one may have to mechanically couple them to the ground by inserting spikes into the ground. Accordingly, using these massive seismometers in a building may be especially difficult.

Some MEMS seismometers use changes in capacitance to measure the acceleration. The sensitivity of most conventional accelerometers is approximately 0.001 g. Most conventional MEMS accelerators use capacitive transduction because they consume little power, have good temperature stability, and are energy efficient.

The MEMS flux concentrator is a device that mitigates the effect of 1/f noise in a sensor by shifting the operating frequency to higher frequencies where 1/f noise is much less important. It does this by placing the flux concentrators on MEMS structures. The motion of the flux concentrators modulates the field seen by the sensor. Typically, SOI wafers are used in the fabrication of the device, wherein the device typically consists of a MEMS structure with MEMS flaps covered by a soft magnetic material (permalloy), a comb drive, and a spin valve magnetic sensor. The device can improve the sensitivity of magnetoresistive sensors by two orders of magnitude.

The conventional accelerometers and seismometers generally have not been sufficiently small or sensitive to be properly utilized in MEMS applications. Accordingly, there remains a need for a new, small, low cost accelerometer or seismometer.

SUMMARY

In view of the foregoing, an embodiment herein provides a microelectromechanical system (MEMS) magnetic device comprising a frame; a magnetic sensor on the frame; a magnet adjacent to the magnetic sensor; a proof mass attached to the magnet; a bendable connecting member attached to the magnet; and a torsion rod attached to the connecting member and the frame, wherein the magnet rotates about a major axis of the torsion rod. Preferably, the proof mass comprises a portion of a silicon on insulator (SOI) wafer, wherein a thickness of the SOI wafer is approximately 500 to 600 microns. Additionally, an acceleration of the frame preferably causes the magnet to move relative to the frame and the magnetic sensor. Moreover, an acceleration of the frame preferably causes the connecting member to bend. Furthermore, the motion of the magnet preferably causes a change in a magnetic field at a position of the magnetic sensor, wherein the change in the magnetic field is preferably detected by the magnetic sensor, and wherein a sensitivity of detection of the acceleration of the MEMS magnetic device is preferably approximately 0.0001 g.

Another embodiment provides a MEMS device comprising a frame; a magnetic sensor attached to the frame; at least one magnet adjacent to the magnetic sensor; a substrate attached to the magnet; a cantilever beam attached to the substrate; and a rod attached to the cantilever beam and the frame, wherein the magnet is adapted to rotate about a longitudinal axis of the rod. Preferably, the substrate comprises a SOI wafer, wherein a thickness of the SOI wafer is approximately 500 to 600 microns. Also, an acceleration of the frame preferably causes the magnet to move relative to the frame and the magnetic sensor. Furthermore, an acceleration of the frame preferably causes the connecting member to bend. Additionally, the motion of the magnet preferably causes a change in a magnetic field at the position of the magnetic sensor, wherein the change in the magnetic field is preferably detected by the magnetic sensor, and wherein a sensitivity of detection of the acceleration of the device is preferably approximately 0.0001 g.

Another embodiment provides a method of forming a MEMS magnetic device, wherein the method comprises connecting a magnetic sensor to a frame; connecting a torsion rod to the frame; attaching a bendable connecting member to the torsion rod; attaching a proof mass to the connecting member; and attaching a magnet on the proof mass and adjacent to the magnetic sensor, wherein the magnet is configured to rotate about a major axis of the torsion rod. Preferably, the proof mass comprises a SOI wafer, wherein a thickness of the SOI wafer is approximately 500 to 600 microns. Moreover, an acceleration of the frame preferably causes the magnet to move relative to the frame and the magnetic sensor. Furthermore, an acceleration of the frame preferably causes the connecting member to bend. Additionally, the motion of the magnet preferably causes a change in a magnetic field at the position of the magnetic sensor, wherein the change in the magnetic field is preferably detected by the magnetic sensor, and wherein a sensitivity of detection of the acceleration of the MEMS magnetic device is preferably approximately 0.0001 g.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new, small, low cost accelerometer or seismometer. The embodiments herein achieve this by providing a MEMS magnetic seismometer that is low in cost to fabricate, highly sensitive, can be easily mechanically coupled to a variety of surfaces, and which can be used to monitor activities (i.e., detect movement) in individual rooms within buildings. Referring now to the drawings, and more particularly to FIGS. 1(A) through 4, where similar reference characters denote corresponding features consistently throughout the figures, there are shown preferred embodiments.

Figure 1A:
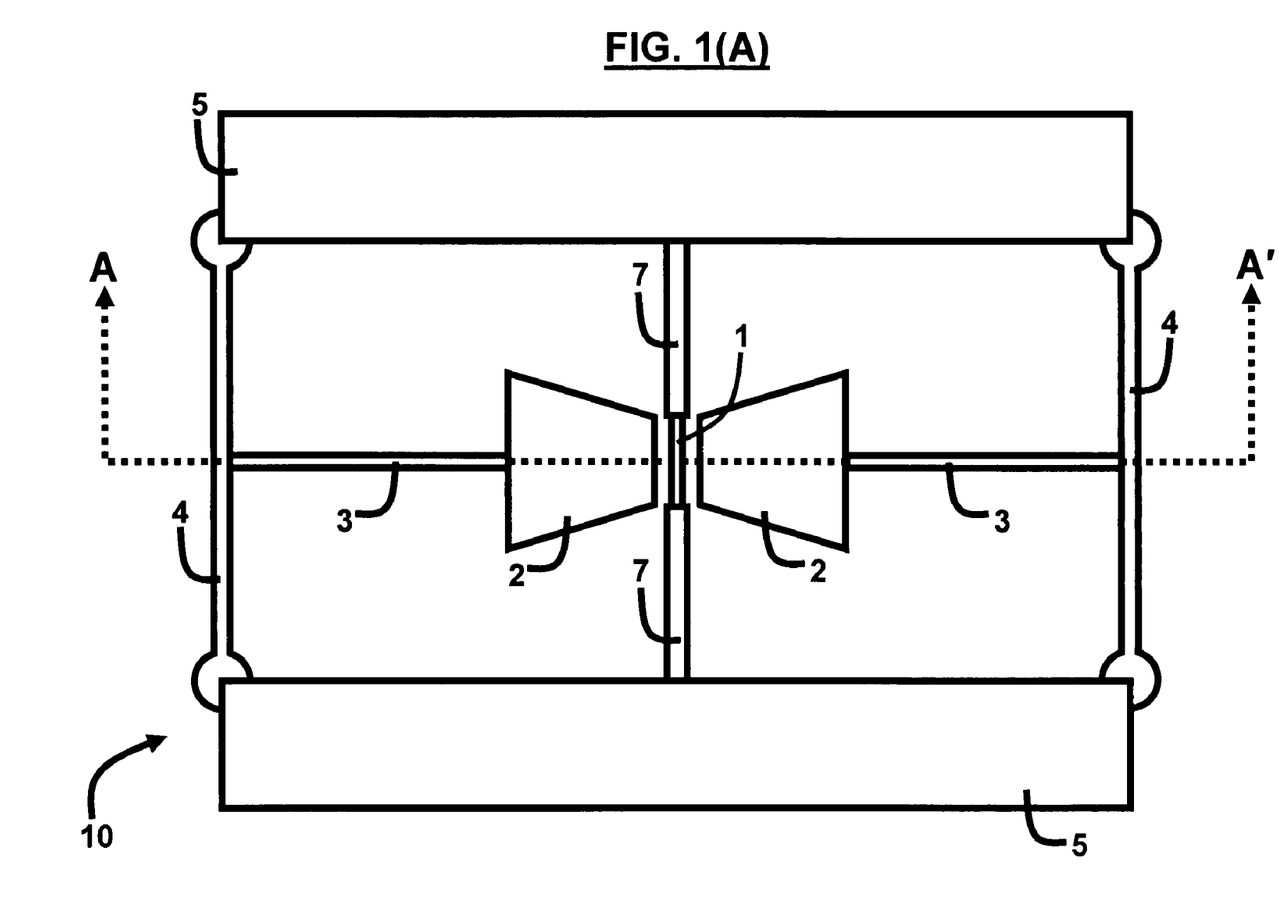
FIG. 1(A) illustrates a schematic diagram of a MEMS magnetic seismometer according to an embodiment herein.
Figure 1B:
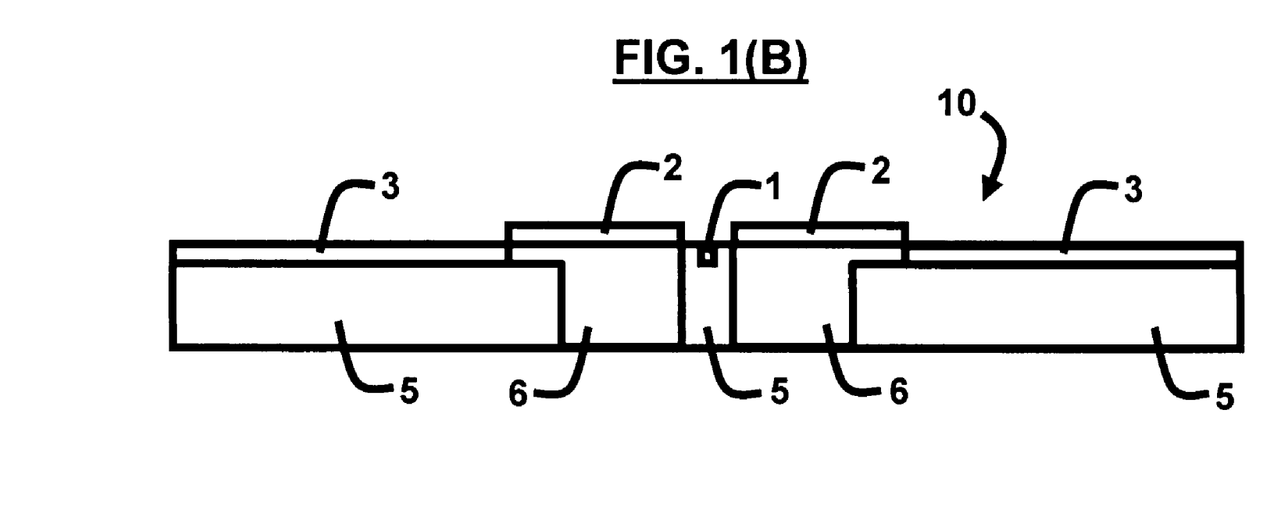
FIG. 1(B) illustrates a cross-sectional diagram of the MEMS magnetic seismometer of FIG. 1(A) cut along line A–A' in FIG. 1(A) according to an embodiment herein.

FIGS. 1(A) and 1(B) illustrate a MEMS device 10 according to an embodiment herein. A magnetic sensor 1 is attached via connectors 7 to a support frame 5. On each side of the sensor 1 are two permanent magnets 2 positioned on silicon flaps 6. The silicon flaps 6 may be thicker in some places to increase its mass. Each flap 6 comprising a magnet 2 connects to a long thin cantilever 3, which then connects to a torsion suspension member 4, which then connects to the frame 5. Thus, the coupling of the magnets 2 to the frame 5 is small and the flaps 6 can easily rotate about the axis of the torsion suspension members 4. The permanent magnets 2 are oriented so that they provide a magnetic field of approximately 10 Oe or more at the position of the magnetic sensor 1. Several different kinds of magnetic sensors 1 can be used in accordance with the embodiments herein. Two possible magnetic sensors are the magnetoresistance and magnetoelectric sensors.

While FIGS. 1(A) and 1(B) illustrate a permanent magnet 2 located on each side of the magnetic sensor 1, one skilled in the art would readily understand that only one permanent magnet 2 could be used (i.e., magnet 2 on one side of the sensor 1 and no magnet on the other side of the sensor 1). If two permanent magnets are used, one would include the force between the magnets 2 in considering the motion of the MEMS structure.

Figure 1C:
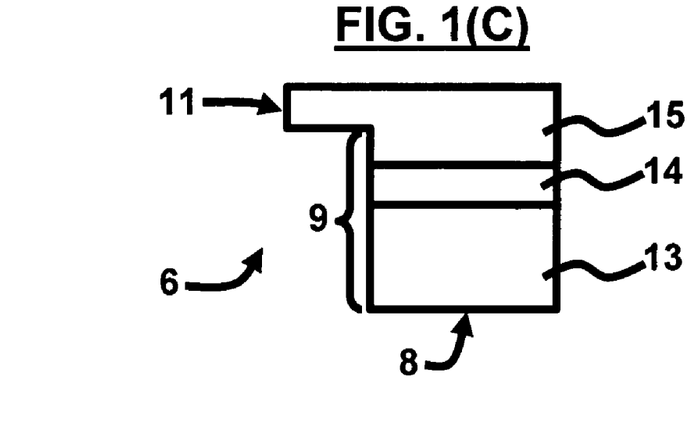
FIG. 1(C) illustrates an isolated view of one of the flaps of the MEMS magnetic seismometer of FIG. 1(B) according to an embodiment herein.

Another alternative is to place magnetic sensors 1 on the flaps 6 formed from the device layer 15 (of FIG. 1(C)) and have a permanent magnet 2 fixed to the frame 5 positioned between two magnetic sensors 1. An example of the type of sensor 1 which could be used according to this embodiment is an extraordinary magnetoresistance sensor.

The device 10 operates as follows. Suppose the frame 5 is suddenly moved upward an amount Δy. The magnetic sensor 1 also moves upward by Δy, but due to the relatively large mass of the flaps 6 and the weak mechanical rotational coupling the flaps 6 to the frame 5, the flaps 6 move upward slowly. Thus, the permanent magnets 2 move downward relative to the magnetic sensor 1. This changes the magnetic field at the position of the sensor 1. If the device 10 is fragile, it can be protected before deployment by using protective connections such as those described in U.S. patent application Ser. No. 11/345,542, entitled, "MEMS Structure Support and Release Mechanism," the complete disclosure of which, in its entirety, is herein incorporated by reference.

As shown in FIG. 1(C), the flaps 6 may include an approximately 500–600 micron thick silicon on insulator (SOI) wafer 8 comprising a silicon device layer 15, a silicon oxide layer 14, and a silicon handle layer 13 as further described in U.S. patent application Ser. No. 11/345,542. In this case, the thick regions 9 of the flaps 6 could include the device layer 15, the silicon oxide layer 14, and the handle layer 13. The thinner regions 11 of the flaps 6 would not include the handle layer 13 and might not include the silicon oxide layer 14 depending on the desired sensitivity of the sensor 1. Decreasing the thickness of the permanent magnets 2 and the separation between them increases the sensitivity of the sensor 1.

The following is an estimate of the displacement of the silicon flaps 6, which acts as a proof mass when it experiences one g of acceleration. The displacement is a sum of the displacement due to the bending of the cantilever 3 and the rotation of the torsion suspension member 4. The governing equation for the displacement δ due to the bending of the cantilever beam 3 is:

$$\delta = PL^3/3EI$$

where P is the weight of the proof mass (flap 6), L is the length of the beam 3, E is the modulus of elasticity of the beam 3, and I is the moment of inertia of a plane area of the beam 3. If the beam 3 is composed of silicon, δ due to the bending of the beam 3 is 23 microns.

The governing equation for the displacement $\delta_\phi$ due to the rotation of the torsion suspension member 4 is:

$$\delta_\phi = L\phi = TL^2/GI_p = mgL^3/GI_p$$

where T is the torque of the torsion suspension member 4, L is the length of the torsion suspension member 4, G is the shear modulus and $I_p$ is the polar moment of inertia. $I_p = bh^3/12$. Using G=70 GPa, $\delta_\phi$=3.6 microns.

The following is an example of how the device 10 could be fabricated. Beginning, with a SOI wafer 8, having a device layer 15 that has a resistivity of approximately 0.1 ohm cm. One alternative, is to use an SOI wafer that has epoxy and not $SiO_2$ separating the device layer from the handle layer. Another alternative is to deposit a metal instead of using doping or ion implanting to create the low resistivity regions. The thickness of the device layer 15 could be approximately 3–5 microns thick. Preferably, the device layer 15 and handle layer 13 are well bonded to the silicon oxide layer 14. Next, the magnetic sensor 1 is deposited anywhere on the surface of the device layer 15. Then, standard lithography techniques are used to deposit the permanent magnets 2 and to define the flaps 6. Upon completion of this step, a deep reactive ion etching (DRIE) process is used to remove the unwanted portions of the device layer 15. If necessary, one can also remove unwanted portions of the handle layer 13 by DRIE.

Thereafter, gold electrodes (not shown) and paths (not shown) are deposited to connect to the magnetic sensor 1. Next, the flaps 6 are released such that they are independently movable compared to the sensor 1 by immersion in hydrofluoric (HF) acid and using critical point drying. If the epoxy SOI wafer is used, then one can use an oxygen plasma to do the release step. This has the advantage of avoiding possible damage to the magnetic sensor due to immersion in HF. Alternatively, the MEMS structure and the magnetic sensor 1 could be fabricated on separated wafers and bonded together by flip chip bonding. This method has the advantage that the magnetic sensor 1 would not be exposed to HF.

Figure 2A:
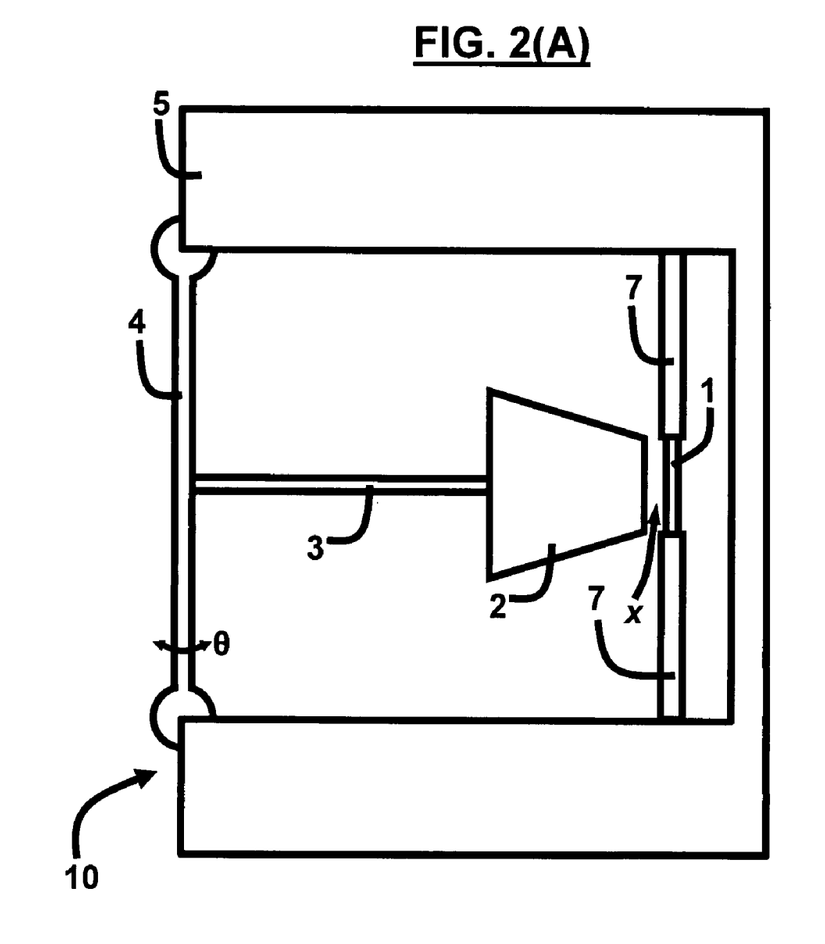
FIGS. 2(A) and 2(B) illustrate alternate views of the angular displacement of the flux concentrator of FIGS. 1(A) and 1(B) according to an embodiment herein.
Figure 2B:
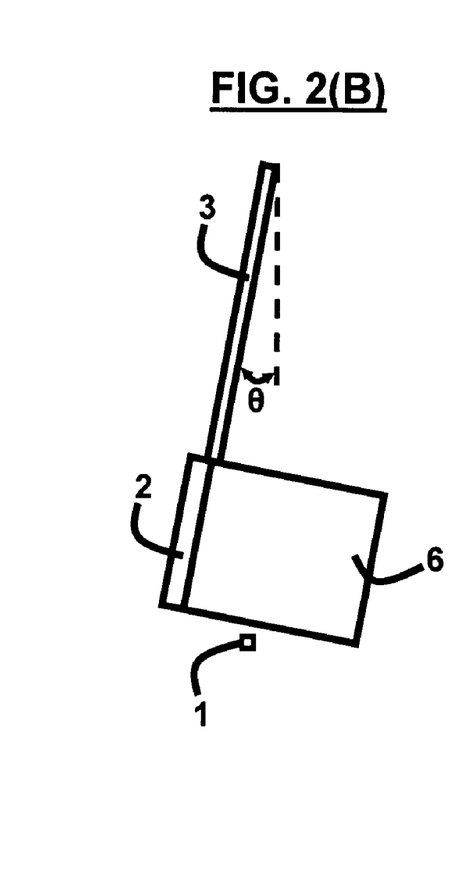

An estimate of the performance of the sensor 1 can be made by considering how the magnetic field changes at the position of the magnetic sensor 1 as a force on the frame 5 supporting the flaps 6 creates an angle, θ, between the plane of the frame 5 and the flaps 6. The angle, θ, is shown in FIGS. 2(A) and 2(B). The space, x, between the edge of the permanent magnet 2 and the magnetic sensor 1 is approximately 30 microns. The magnetic sensor 1 measures the magnetic field that emerges from the end of the thin permanent ferromagnet 2. The large proof mass (i.e., flaps 6) will tend to be directly beneath the axis of rotation. The flaps 6 do not lie directly beneath the axis of rotation because of the mechanical force of the torsion suspension member 4 and cantilever 3. In the absence of accelerations of the frame 5, the angle θ can be controlled by rotating the frame 5. Accelerations in the horizontal direction will change the angle θ. As the angle θ changes, the separation between the magnetic sensor 1 and edge of the permanent magnet 2 changes. This modifies the magnetic field at the position of the sensor 1. Because the magnetic sensor 1 can detect very small changes, the device 10 is very sensitive.

Figure 3:
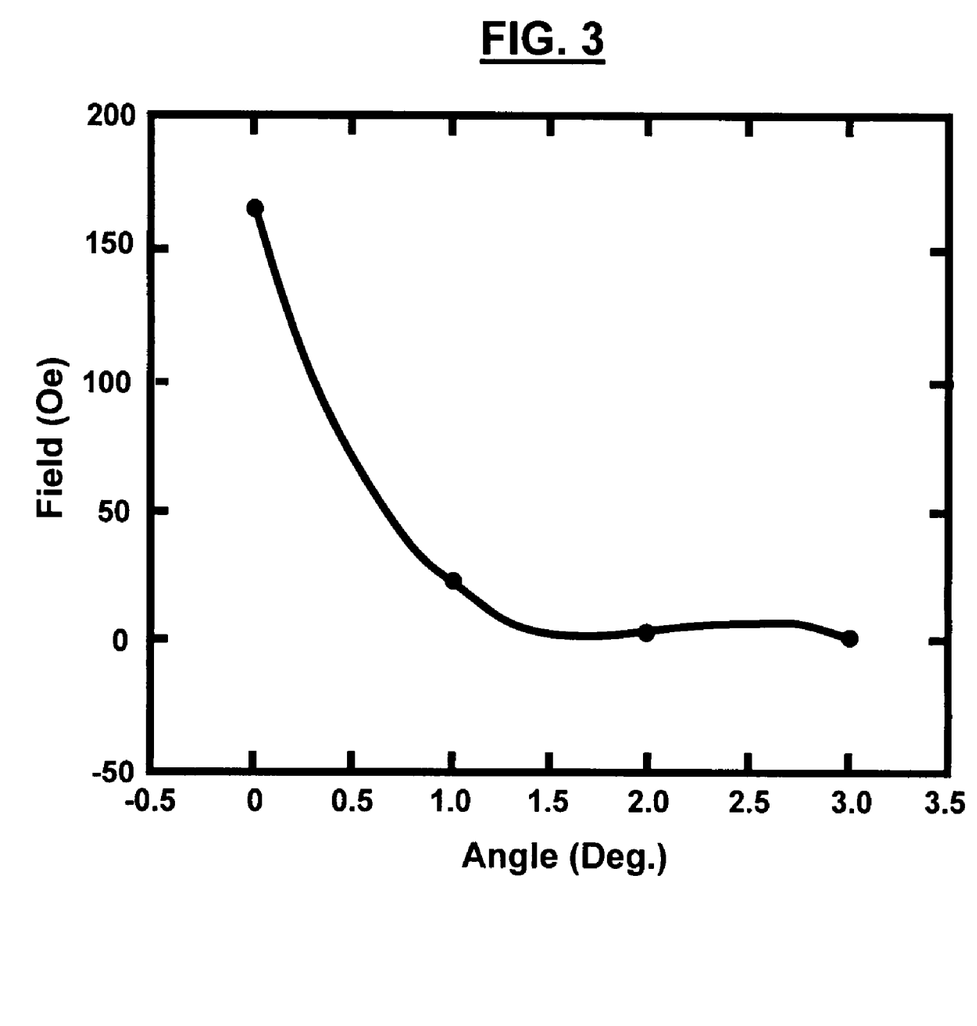
FIG. 3 is a graphical illustration of the strength of the magnetic field at the position of the magnetic sensor of FIGS. 2(A) and 2(B) as a function of the angular displacement of the flux concentrator of FIGS. 2(A) and 2(B) according to an embodiment herein.

In the calculation of the estimate of the performance of the MEMS device 10, the thickness of the ferromagnetic material ($SmCo_{28}$) which constitutes the permanent magnet 2 is approximately 0.5 microns, and the permanent magnet 2 is rotated about the longitudinal (or major) axis of the torsion suspension member 4. An estimate made using the finite element analysis software Maxwell®, available from Ansoft Corporation, Pennsylvania, USA, of the field dependence of the magnetic field at the position of the sensor 1 is graphically illustrated in FIG. 3. A change of 0.0001 g yields a field change of approximately 0.35 Oe. This is a very large field change that can be easily measured using standard techniques. FIG. 3 generally indicates that as the angle of rotation increases, the field of dependence of the magnetic field at the position of the sensor 1 generally decreases until it reaches approximately 2° of rotation, which generally corresponds with a 0 Oe field dependence of the magnetic field. For larger angles, the field change with angle is very small.

In one embodiment, the initial or at rest angle $\theta_0$ could be approximately 23° if the frame 5 is not rotated. Thereafter, the frame 5 is rotated such that, in the absence of an acceleration of the frame 5, the angle θ will be reduced to approximately zero. If the frame 5 of the MEMS device 10 experiences a sudden displacement, the angle θ and the magnetic field at the position of sensor 1 will change.

The center of mass of the proof mass (i.e., flap 6) will tend to hang directly beneath the axis of rotation in FIG. 2(B). However, this will bend the cantilever beam 3 and twist the torsion suspension member 4. As a first approximation, this effect will be ignored. In this case, θ=22.6° and the force tending to twist the torsion suspension member 4 is 0.384 mg. Suppose the frame 5 is tilted so that with zero acceleration θ=0° and the calculated field is 168 Oe, an acceleration of $10^{-4}$ g will change the field by:

$$dH \approx \frac{dH}{d\theta} d\theta = 146 \times 0.0026 \approx 0.38 \text{ Oe}$$

This is a large field change that can be easily measured with the sensor 1. Furthermore, the device 10 can be calibrated by rotating the device 10 and using the force of gravity to change θ.

Figure 4:
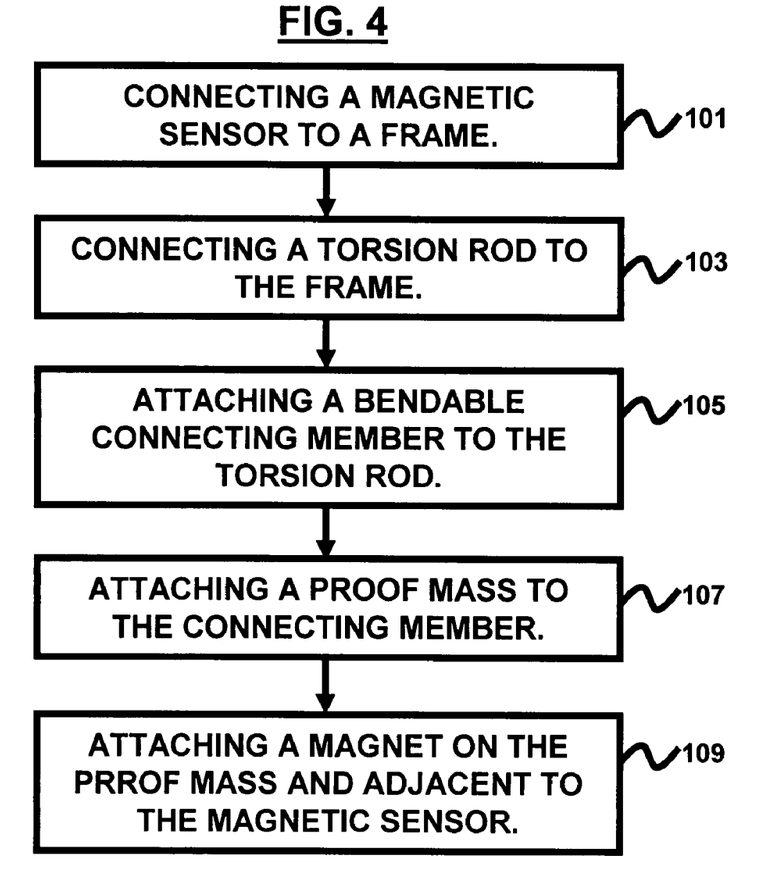
FIG. 4 is a flow diagram illustrating a preferred method according to an embodiment herein.

FIG. 4 illustrates a method of forming a MEMS device 10 according to an embodiment herein, wherein the method comprises connecting (101) a magnetic sensor 1 to a frame 5; connecting (103) a torsion rod 4 to the frame 5; attaching (105) a bendable connecting member 3 to the torsion rod 4; attaching (107) a proof mass 6 to the connecting member 3; and attaching (109) a magnet 2 on the proof mass 6 and adjacent to the magnetic sensor 1, wherein the magnet 2 is configured to rotate about a major axis of the torsion rod 4. Preferably, the proof mass 6 comprises a SOI wafer 8, wherein a thickness of the SOI wafer 8 is approximately 500 to 600 microns. Moreover, an acceleration of the frame 5 preferably causes the magnet 2 to move relative to the frame 5 and the magnetic sensor 1. Furthermore, an acceleration of the frame 5 preferably causes the connecting member 3 to bend. Additionally, the motion of the magnet 2 preferably causes a change in a magnetic field at a position of the magnetic sensor 1, wherein the change in the magnetic field is preferably detected by the magnetic sensor 1, and wherein a sensitivity of detection of the acceleration of the MEMS device 10 is preferably approximately 0.0001 g.

The embodiments herein use a total thickness of the wafer 8 to get a large proof mass 6 for the device 10. The accelerations of the frame 5 create a rotation about an axis of the torsion suspension member 4 thereby creating the bending of the cantilever beam 3. Moreover, the rotations change the magnetic field at the position of the magnetic sensor 1, and the change can be easily detected by the magnetic sensor 1. The embodiments herein consume approximately 5 to 100 milliwatts. Generally, the embodiments herein provide a simpler and lower cost technology than conventional MEMS accelerometers. The MEMS device 10 provided by the embodiments herein may be easily coupled to floors and other surfaces in buildings by using any suitable epoxy, wherein one only has to couple the sensor 1 to the bonding surface. The electronics, power, etc. can be in a separate box (not shown) that is connected to the sensor 1 by wires (not shown).

More specifically, the embodiments herein provide a novel approach of combining MEMS technology and magnetic sensor technology to measure accelerations. By using a large proof mass 6 and a sensitive magnetic sensor 1, an accelerometer 10 is created that is a factor of 10 more sensitive (i.e., $10^{-4}$ g) than current commercial MEMS accelerometers (generally $10^{-3}$ g) that are based on measuring small capacitive changes. If the sensor 1 is a magnetoresistance device, then one only needs to supply a constant current and measure the voltage change for the accelerometer 10 to function.

The MEMS device 10 is structurally different from a MEMS flux concentrator in numerous ways including: (1) the soft magnetic material on the MEMS flaps 6 is replaced by a hard magnet 2; (2) in a preferred embodiment, there is only one MEMS flap 6, although multiple flaps 6 could be used; (3) there in no comb drive; (4) the MEMS support cantilever beam 3 is very flexible; (5) the flap 6 hangs at an angle θ. The embodiments herein provide a small, sensitive MEMS magnetic seismometer 10 that can be used to detect the motion of people and vehicles. The embodiments herein combine a flexible cantilever 3 and permanent magnets 2 with a small magnetic sensor 1 to provide a very small highly sensitive magnetic seismometer 10. Alternatively, the magnets 2 could be stationary and the magnetic sensor 1 could be placed on MEMS structures. Which method is employed depends upon the choice of sensor 1 and the application.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A microelectromechanical system (MEMS) magnetic device comprising:
   a frame;
   a magnetic sensor on said frame;
   a magnet adjacent to said magnetic sensor;
   a proof mass attached to said magnet;
   a bendable connecting member attached to said magnet; and
   a torsion rod attached to said connecting member and said frame,
   wherein said magnet rotates about a major axis of said torsion rod.

2. The MEMS magnetic device of claim 1, wherein said proof mass comprises a portion of a silicon on insulator (SOI) wafer, wherein a thickness of said SOI wafer is approximately 500 to 600 microns.

3. The MEMS magnetic device of claim 1, wherein an acceleration of said frame causes said magnet to move relative to said frame and said magnetic sensor.

4. The MEMS magnetic device of claim 1, wherein an acceleration of said frame causes said connecting member to bend.

5. The MEMS magnetic device of claim 1, wherein a motion of said magnet causes a change in a magnetic field at a position of said magnetic sensor.

6. The MEMS magnetic device of claim 5, wherein said change in said magnetic field is detected by said magnetic sensor.

7. The MEMS magnetic device of claim 6, wherein a sensitivity of detection of an acceleration of said MEMS magnetic device is approximately 0.0001 g.

8. A microelectroinechanical system (MEMS) device comprising:
   a frame;
   a magnetic sensor attached to said frame;
   at least one magnet adjacent to said magnetic sensor;
   a substrate attached to said magnet;
   a cantilever beam attached to said substrate; and
   a rod attached to said cantilever beam and said frame,
   wherein said magnet is adapted to rotate about a longitudinal axis of said rod.

9. The MEMS device of claim 8, wherein said substrate comprises a silicon on insulator (SOI) wafer, wherein a thickness of said SOI wafer is approximately 500 to 600 microns.

10. The MEMS device of claim 8, wherein an acceleration of said frame causes said magnet to move relative to said frame and said magnetic sensor.

11. The MEMS device of claim 8, wherein an acceleration of said frame causes said connecting member to bend.

12. The MEMS device of claim 8, wherein a motion of said in magnet causes a change in a magnetic field at a position of said magnetic sensor.

13. The MEMS device of claim 12, wherein said change in said magnetic field is detected by said magnetic sensor.

14. The MEMS device of claim 13, wherein a sensitivity of detection of an acceleration of said MEMS device is approximately 0.0001 g.

15. A method of forming a microelectromechanical system (MEMS) magnetic device, said method comprising:
   connecting a magnetic sensor to a frame;
   connecting a torsion rod to said frame;
   attaching a bendable connecting member to said torsion rod;

attaching a proof mass to said connecting member; and attaching a magnet on said proof mass and adjacent to said magnetic sensor, wherein said magnet is configured to rotate about a major axis of said torsion rod.

16. The method of claim 15, wherein said proof mass comprises a portion of a silicon on insulator (SOI) wafer, wherein a thickness of said SOI wafer is approximately 500 to 600 microns.

17. The method of claim 15, wherein an acceleration of said frame causes said magnet to move relative to said frame and said magnetic sensor.

18. The method of claim 15, wherein an acceleration of said frame causes said connecting member to bend.

19. The method of claim 15, wherein a motion of said magnet causes a change in a magnetic field at a position of said magnetic sensor.

20. The method of claim 19, wherein said change in said magnetic field is detected by said magnetic sensor.

21. The method of claim 20, wherein a sensitivity of detection of an acceleration of said MEMS magnetic device is approximately 0.0001 g.

* * * * *